United States Patent [19]

Hunt et al.

[11] Patent Number: 4,656,898
[45] Date of Patent: Apr. 14, 1987

[54] PORTABLE LATHE DEVICE

[75] Inventors: Christopher C. Hunt; Paul M. Strait, both of Newberg, Oreg.

[73] Assignee: Climax Manufacturing Company, Newberg, Oreg.

[21] Appl. No.: 610,021

[22] Filed: May 14, 1984

[51] Int. Cl.⁴ .............................................. B23B 5/16
[52] U.S. Cl. ..................................... 82/4 R; 82/4 C; 408/106; 408/129; 409/233
[58] Field of Search ................ 82/4 R, 4 C, 2 A, 2 E; 408/104, 105, 106, 107, 129; 409/233

[56] References Cited

U.S. PATENT DOCUMENTS

| | | | |
|---|---|---|---|
| 2,209,867 | 7/1940 | Wohlhaupter | 82/2 E |
| 3,141,365 | 7/1964 | Peters | 82/4 R |
| 3,273,432 | 9/1966 | Hasund | 82/4 R |
| 3,630,109 | 12/1971 | MacMichael | 82/4 C |
| 4,167,218 | 9/1979 | Horiuchi | 409/233 |
| 4,250,777 | 2/1981 | Sorenson | 82/2 E |
| 4,314,491 | 2/1982 | Hartmann | 82/4 C |
| 4,411,178 | 10/1983 | Wachs et al. | 82/4 C |
| 4,452,110 | 6/1984 | Emmerson | 82/4 C |
| 4,483,223 | 11/1984 | Null et al. | 82/4 R |

Primary Examiner—Nicholas P. Godici
Assistant Examiner—Jerry Kearns
Attorney, Agent, or Firm—Dellett, Smith-Hill & Bedell

[57] ABSTRACT

A portable lathe device is modular in character and can be employed for flange facing, line boring or other purposes. The spindle carrying the tool means is readily axially adjustable, and the radial feed rate for a facing head tool carrier is infinitely variable and reversable.

10 Claims, 11 Drawing Figures

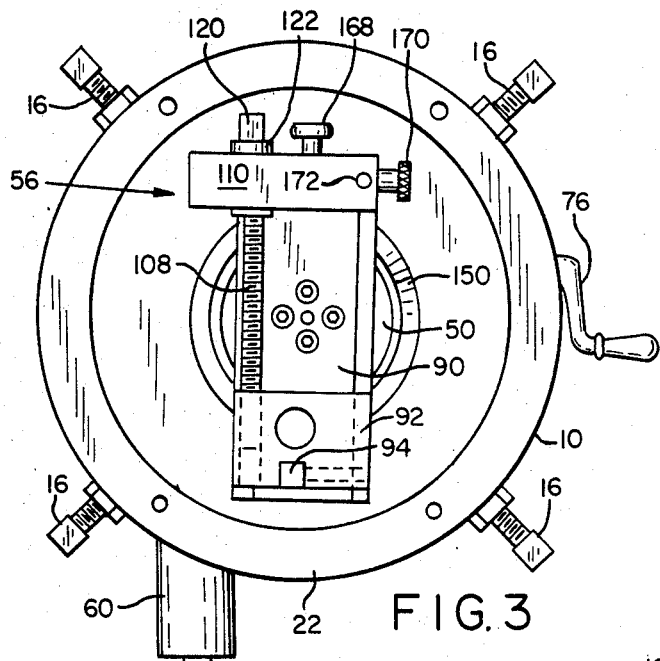
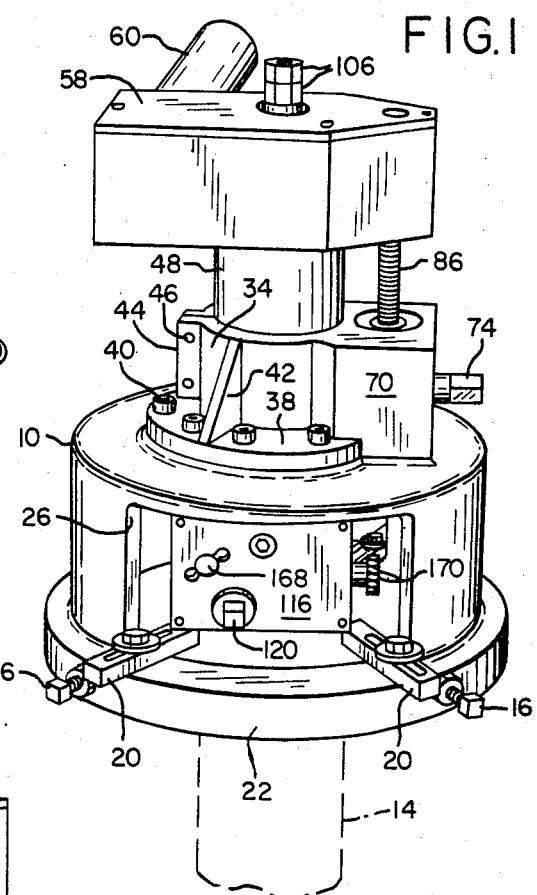
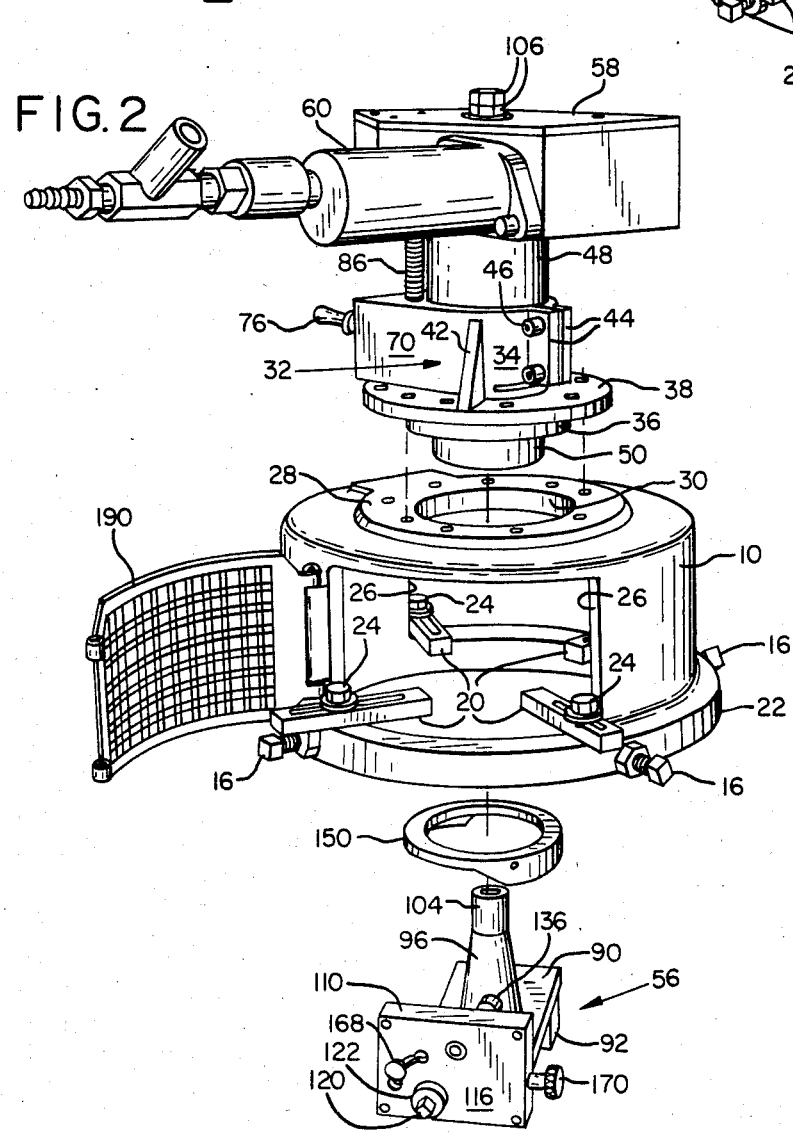
FIG.1
FIG.3
FIG.2

PORTABLE LATHE DEVICE

BACKGROUND OF THE INVENTION

The present invention relates to a portable lathe device and particularly to a lathe device that is modular in construction.

Portable machine tools are adapted to be mounted on or proximate the work to be machined rather than requiring the work to be transported to a stationary tool. Thus in pipeline applications the machining of flange faces on large sections of pipe can be more easily accomplished in the field since it is often difficult or impossible to disconnect pipe sections for transport to a machine shop. The same problem occurs in the machining of large parts and housings utilized in nuclear power plants, ocean going vessels, or for that matter in any application where the component to be machined is exceptionally large or difficult to move.

Portable flange facing devices are available which mount either on the inside diameter of a pipe or similar object or on the outside diameter thereof. The inside mounting type of course requires sufficient interior space within the work piece for receiving the tool and this type of mounting does not allow machining down to the "center" of a flange. On the other hand, exterior mounting devices frequently include a bearing which is larger than the diameter of the flange to be machined and are advantageously of heavy construction in order to avoid distortion of the tool during operation and resulting inaccuracies in finishing.

A central spindle machine carrying a cutting tool interiorly of a mounting bell, positioned exteriorly of the work, has the ability to face from the center of a flange outwardly while also providing stable support and drive for the cutting tool. However, machines of this type are restrictive in their capabilities. Usually, the axial movement of the cutting tool is limited and access to the work surface being machined is restricted. Furthermore, automatic tool feed, radially across the flange being finished, tends to be complicated and non-adjustable. An example of a tool of this type is illustrated in Hasund U. S. Pat. No. 3,273,432.

Furthermore, portable machine tools are quite specialized, not only as to purpose but as to the actual size of the work which can be accomodated. A portable tool adapted for flange facing is generally not usable for boring, or vice versa, and an entirely different machine tool would be used in facing a large flange as compared with a small flange.

SUMMARY OF THE INVENTION

In accordance with the present invention, a portable lathe device adapted for mounting on work to be machined includes a universal power unit for rotating a spindle adapted to receive a detachable tool means. The power unit is carried by a mounting or clamping portion which is attached to the work to be machined but which is replaceable whereby a larger or smaller mounting or clamping portion may be substituted as appropriate for the work piece involved. The power unit is also axially slidable with respect to the mounting portion for positioning tool means axially with respect to the work. An axial feed screw, outboard from the power unit spindle, extends between the power unit and the mounting portion.

In a particular embodiment, a quill clamp is removably attached to the mounting portion, and the power unit comprises a quill housing axially slidable within the quill clamp and rotatably supporting the spindle. The axial feed screw is operable by gear means located on the quill clamp and threadably engages the power unit whereby to slide the quill housing with respect to the quill clamp. Appreciable axial movement of the spindle and tool means carried thereby is consequently afforded. Moreover, varying lengths of quill housing-spindle mechanisms, as well as various lengths of axial feed screws, may be employed for securing differing degrees of axial movement. The extended axial movement is particularly desirable when the tool means comprises an axial boring bar which is thereby made easily adjustable in an axial direction.

In accordance with another aspect of the present invention, the tool carrier forming a part of a facing head tool means is infinitely adjustable in respect to radial feed rate, and also in direction of feed, by means of simple control adjustment.

In structure according to the present invention the mounting or clamping means, the power means including a quill housing and spindle, a quill clamp which provides for slidable movement of the power means, and the tool means, are separate modular units which can be replaced by units of varying size, function and shape whereby the device according to the present invention is usable in a large number of different applications without requiring separate tools of specialized form.

It is accordingly an object of the present invention to provide an improved portable lathe device which is modular in construction and usable for a number of different purposes.

It is another object of the present invention to provide an improved portable lathe device having readily adjustable axial adjustment and a greater degree of axial adjustment than prior devices.

It is a further object of the present invention to provide an improved portable lathe device which can be utilized both for flange facing and line boring.

It is another object of the present invention to provide an improved portable lathe device having an infinitely adjustable and reversable feed rate.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view of a portable lathe device according to the present invention, FIG. 2 is an exploded view of the FIG. 1 device showing modular parts separated, FIG. 3 is a bottom view of the FIG. 1 device, FIG. 4 is a vertical cross section of the FIG. 1 device, FIG. 5 is a detail view, partly broken away, of a facing head employed with the FIG. 1 device, FIG. 6 is a partial vertical cross sectional side view of the FIG. 1 device, FIG. 7 is a transverse cross sectional view of the FIG. 1 device taken at 7—7 in FIG. 4, FIG. 8 is an exploded view of a facing head employed with the FIG. 1 device, FIG. 9 is a partial vertical cross sectional view of a portable lathe device according to the present invention, illustrating alternative tool means, FIG. 10 is a vertical cross sectional view of a portable lathe device according to the present invention illustrating alternative tool means and alternative mounting means, and FIG. 11 is a partial vertical cross sectional view of a portable lathe device according to the present invention illustrating a further alternative tool means construction.

DETAILED DESCRIPTION

Figures 4, 5:
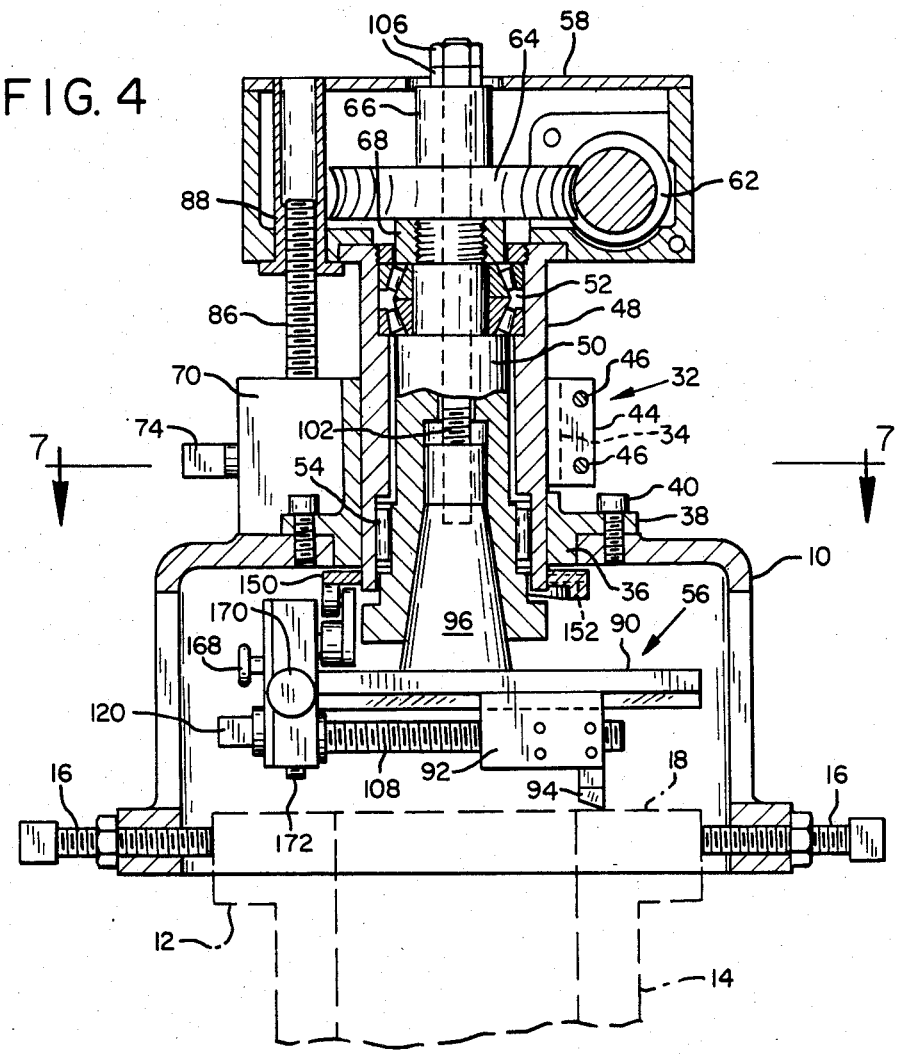
Figure 6:
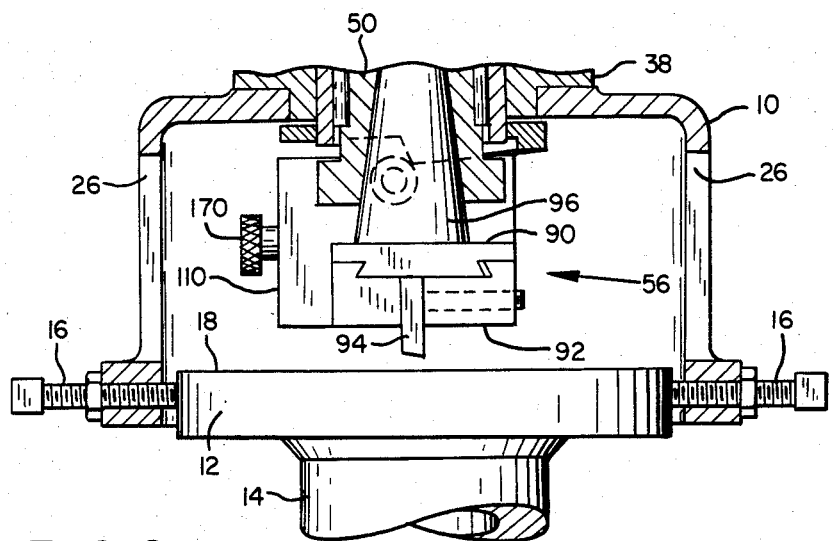

Referring to the drawings and particularly to FIGS. 1 through 7 illustrating the portable lathe device according to the present invention, a mounting means or bell 10 is employed for attaching the portable lathe device to the outside diameter of the work to be machined. In an illustrated example, the bell 10 is supported via mounting screws 16 to the outer periphery of a flange 12 on the end of pipe 14, wherein the face 18 of flange 12 is to be machined. In setting up the lathe device, a number of positioning bars 20 are attached to the upper side of radial skirt 22 of the bell 10 with bolts 24 and the bell is positioned over the flange 12 so as to be supported upon the bars 20. The bars 20 extend through large side openings 26 in the bell 10, covered during later operation by grill 190. Adjusting screws 16 are then turned for engaging the outer diameter of flange 18, and the bolts 24, together with bars 20, are removed.

Mounting bell 10 has a central boss 28 on its upper side provided with a central opening 30 which is adapted to receive quill clamp 32. Quill clamp 32 has a cylindrical clamping portion 34 and a slightly enlarged lower end 36 receivable into aperture 30, and a radial flange 38 which can be secured to boss 28 by means of bolts 40. Webs 42 join cylindrical portion 34 of the quill clamp to flange 38, and cylindrical portion 34 is joined to flange 38 except for approximately one-third of its circumference where the cylindrical portion is split and provided with vertical end tabs 44 which can be drawn together in clamping relation by bolts 46. Within cylindrical portion 34 is received a cylindrical quill housing 48 rotatably supporting vertical spindle 50. The quill housing 48 is slidable in a vertical or axial direction within the quill clamp 32, with the bolts 46 being adjusted to provide the desired degree of slidable mating between the cylindrical exterior of member 48 and the cylindrical interior of member 34.

Spindle 50 is rotatably supported within quill housing 48 on bearings 52 and 54, and carries at its lower end a tool means 56 here comprising a facing head used for finishing flange face 18 as the spindle rotates. Quill housing 48 is axially slidable within quill clamp 32, for the purpose of adjusting the vertical position of the tool means with respect to the work.

A gear box housing 58 is attached to the upper end of quill housing 48 and supports a drive means comprising an air motor 60, the forward end of which is bolted to the side of the gear box. The air motor shaft rotates worm 62 within gear box 58 for the purpose of rotating worm gear 64 affixed to the upper, reduced diameter end 66 of spindle 50. The worm gear 64 is suitably separated from thrust bearings 52 by a spacer 68. The housing 48, spindle 50, gear box 58, and air motor 60 together comprise a central power unit or universal power head utilized for rotating tool means 56 centrally within the mounting bell 10.

Figure 7:
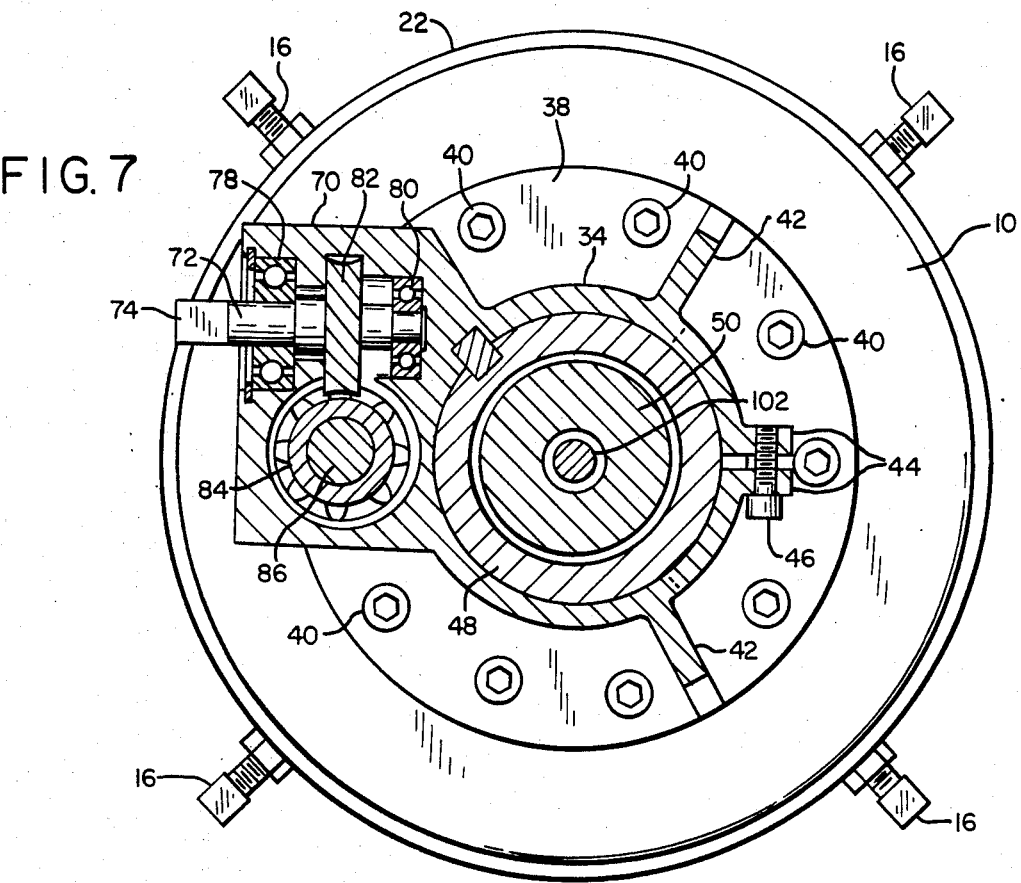

A shaft 72 extends outwardly from a second gear box housing 70 affixed to one side of the quill clamp and is provided with a square end 74 engagable by a crank 76 which is selectively positionable as shown for rotating the shaft. Shaft 72 is journaled in bearings 78 and 80 respectively located at the outer and inner ends of gear box 70, a first helical gear 82 being affixed to the shaft 72 midway between the bearings. As can be seen in FIG. 7, helical gear 82 is disposed in a vertical plane (when the lathe device is mounted vertically) and engages a horizontally disposed helical gear 84 affixed to the lower end of axial feed screw 86. Feed screw 86 extends vertically upwardly from gear box 70 where it threadably mates with elongated nut member 88 fixedly mounted through apertures in the lower and upper walls of gear box 58. As can be seen, rotation of shaft 72 by crank 76 adjusts the axial position of the central power unit including quill housing 48 relative to the quill clamp 32 attached to bell 10. Therefore, rotation of the shaft 72 moves the tool means 56 in an axial direction relative to the work, or adjusts the depth of cut. It will be observed that appreciable vertical adjustment is readily accomplished with a given length of axial feed screw 86 especially since the axial feed screw can extend completely through nut member 88 and protrude above gear box 58. The vertical adjusting screw 86 can be extended without running into a surface such as the surface being machined. Moreover, the device according to the present invention may be provided with differing quill clamps with differing length axial feed screws as well as with power units with spindles of differing lengths having the advantages hereinafter described.

As illustrated in FIGS. 1 through 6, the tool means may comprise a facing head which is removably mounted on the spindle 50 of the power unit. In particular, the facing head comprises a horizontal tool slide 90 having dovetail ways for carrying tool carrier 92 having a slot within which the tool or cutter 94 is secured. The tool slide 90 is affixed to the end of a standard male machine tool taper 96 which is matingly receivable within the lower end of spindle 50. As further illustrated in FIG. 8, taper 96 is provided with a slot 98 at the bottom thereof which receives a key 100 normally disposed in a recess in the top of slide 90, with machine screws extending through the slide 90 and key 100 into the bottom of taper 96. The taper is then removably secured to the power unit employing a drawbolt 102 threadably received in the top cylindrical portion 104 of taper 96 and extending through an axial bore of spindle 50. Nuts 106 are employed for securing the drawbolt and are tightened down against portion 66 of the spindle. It will be readily apparent that the tool means is readily removable by loosening nuts 16 and withdrawing the drawbolt and taper from the spindle whereby the tool means illustrated in FIGS. 1 through 6 and 8 is replaceable by other tool means as hereinafter more fully described.

Figure 8:
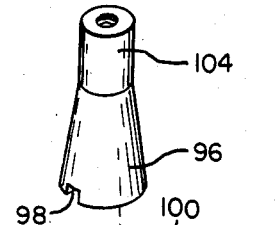

The movement of the tool carrier in a radial direction is accomplished by a lead screw 108 which is rotatable and which threadably engages tool carrier 92 for moving the same. Referring especially to FIGS. 5 and 8 illustrating the construction of the facing head mechanism in detail, the lead screw 108 is mounted in a bearing in housing 110 attached to one end of slide 90 and engages threaded bore 112 in tool carrier 92. The forward, nonthreaded end 114 of lead screw 108 extends through housing cover 116 where it is attached to dial carrier 18 having a square end 120. Cross feed dial 122 is mounted on dial carrier 118 and can be used to gauge the position of the lead screw, and hence the tool carrier, for example when square head 120 is rotated by detachable cross feed crank 124, either directly or via an extension 126. Rotation of crank 124, when mounted in the described manner, rotates lead screw 108 for positioning tool carrier 92 and hence tool 94 radially with respect to the flange face 18.

Rotation of lead screw 108 for moving tool carrier 92 in a radial direction for flange facing is preferably accomplished automatically by the facing head mechanism. A lead screw gear 128 is secured to portion 114 of the lead screw and can be automatically rotated, either by way of gear 130 or reversing gear 132 when the spindle 50 carrying taper 96 rotates. Cam follower lever 134 carrying cam follower roller 136 is clamped to shaft 138 passing through Torrington roller clutch 140 mounted within clutch gear 130. When the shaft 138 rotates in a clockwise direction (as viewed in FIG. 5) the clutch engages and turns gear 130. When shaft 138 rotates in the opposite direction, the clutch is disengaged. The shaft 138 is rotated in the opposite (counterclockwise) direction by clutch return spring 142 attached to arm 144 secured to shaft 138.

The cam follower 136 is urged by spring 142 toward feed cam 150 removably mounted on the lower end of quill housing 48 with set screws 152. As the facing head carrying housing 110 is rotated by the spindle in the direction indicated by arrow 154 in FIG. 5, the cam follower roller 136 moves along long "rising" slope 158 of feed cam 150, rotating shaft 138 in a clockwise direction, and also rotating clutch gear 130 in a clockwise direction. Assume now that carrier arm 162 is moved to the right in FIG. 5 such that idler gear 164 attached thereto engages clutch gear 130. Then idler gear 164 will rotate gear 128 attached to end 114 of lead screw 108, causing the latter to rotate and move tool carrier 92 in a first radial direction. When the cam follower roller 136 reaches the shorter slope 166 of feed cam 150, the clutch 140 is disengaged as spring 142 urges the cam roller back to the "lower" cam area. Then the sequence repeats. If carrier arm 162 were to be moved to the left or clockwise in FIG. 5, idler gear 164 would engage reversing gear 132, and the latter, disposed in meshing engagement with clutch gear 130, would drive gears 164 and 128 in the opposite direction so as to reverse the rotation of the lead screw and hence the motion of the tool carrier. The carrier arm 162 has a third or neutral position, the position illustrated in FIG. 5, wherein idler gear 164 engages neither gear 130 nor gear 132. In this position, the feed screw can be manually turned with crank 124 if desired. Carrier arm 162 is adjusted by knob 168 extending through a slot in cover 116 for the purpose of selecting the direction of automatic feed, or for the purpose of placing the automatic mechanism in "neutral".

Not only the direction of automatic feed is controllable with the feed mechanism as illustrated in FIGS. 5 and 8, but also the amount of feed per revolution of the spindle is infinitely variable. A feed rate adjusting screw 170, extending through one side of housing 110 and threadably engaging the same, abuts the outer end of arm 144. As the feed rate adjusting screw 170 is screwed farther into the housing, it will have the effect of moving cam follower roller 136 away from feed cam 150. An adjustment can be made whereby cam follower roller 136 will contact the feed cam for only part of the revolution of the spindle, and will not drop to the "lowest" portion of the cam. If the cam follower roller only engages the feed cam 150 for a small part of the revolution of the spindle, then shaft 138 will be rotated only by a fraction of its possible movement during each revolution, and lead screw 108 will turn by a similarly small amount. However, if the cam follower roller can return to the "lowest" portion of the cam, so that the roller follows the entire cam slope 158, then a maximum feed or maximum rotation of lead screw 108 for each revolution of the spindle is provided. The feed rate adjustment screw 170 is movable to any position between maximum feed rate and substantially zero feed rate for the lead screw. A pressure and locking screw 172 may be employed for maintaining the adjusting screw 170 in a particular position.

In the preferred embodiment, a double feed cam 150 is employed, i.e. one that has two rising slopes located 180 degrees apart around the quill housing 48.

In accordance with an important feature of the present invention the lathe device is modular, and may be easily separated into distinct component parts for accomplishing various purposes. The respective component parts in the lathe device as thus far disclosed comprise the power unit as hereinbefore described, the bell or mounting element 10, the quill clamp 32, and the tool means 56. The lathe device as illustrated in FIG. 2 is partially disassembled into the separate components, but the quill clamp 32 and the power unit are shown still connected. Tool means 56 is detached by loosening drawbolt 102, and then cam ring 150 is removed by loosening set screws 152. The quill clamp and power unit are separated from the mounting bell by removing screws 40. The power unit can be separated from the quill clamp by rotating feed screw 86 to its end of travel and sliding the two units apart.

In addition to modular components hereinbefore mentioned, and those hereinafter described, further components may be provided in several different sizes. Modularity allows convenient substitution of a larger or smaller diameter bell 10 for accomodating flanges of different diameter. Also, the power unit including quill housing 48 may be provided in different lengths, along with different length feed screws 52, for enabling additional slidable movement of quill housing 48 within quill clamp 86 so as to provide additional axial movement or adjustment of the tool means.

One advantage of the modular construction concerns repair procedure for flange 12. Assume first the lathe device acording to the present invention is fully assembled as illustrated in FIGS. 1, 3 and 4, and is mounted or set up on flange 12 of pipe 14. The flange face 18 may even be initially machined as illustrated in FIG. 4. If it is then desired to weld up a part of a damaged surface face 18, the mounting bell 10 may be left in its mounted position on flange 12, while the tool means 56 and the power unit together with quill clamp 32 are entirely removed from the mounting bell. The tool means is removed via an opening 26. Then a damaged surface of the flange can be welded up through an opening, after which the lathe device is reassembled for further machining. The advantage is that the mounting bell maintains its position determined in the preliminary set up of the machine and exact repositioning of the tool means can be made.

Figure 9:
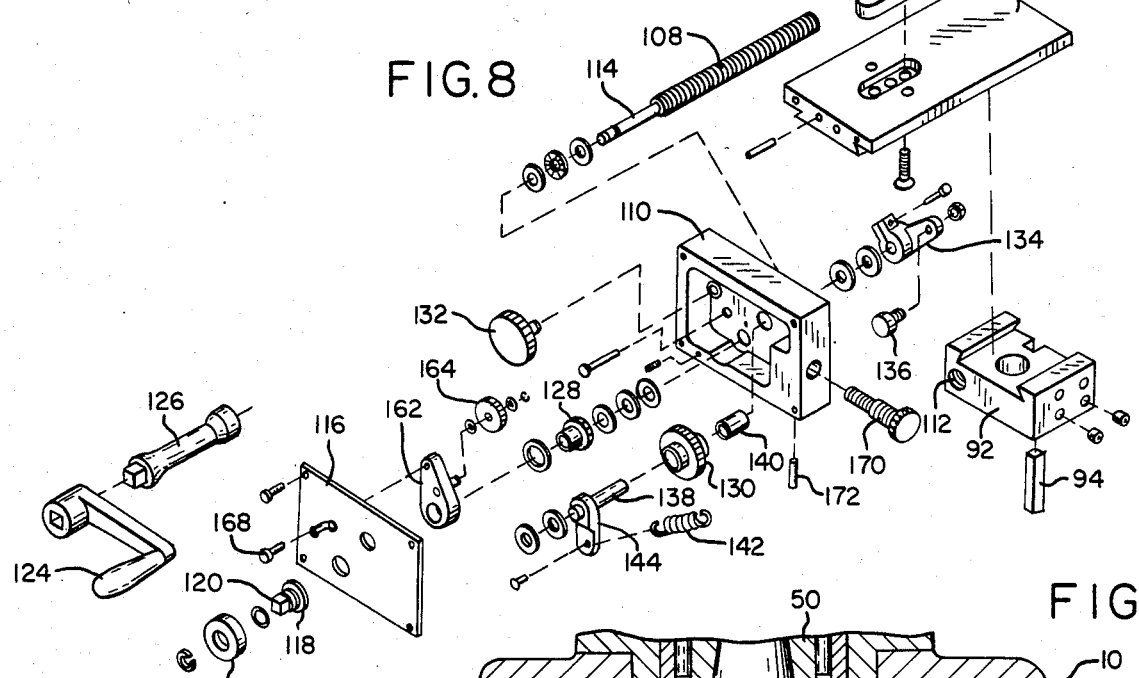
Figure 9:
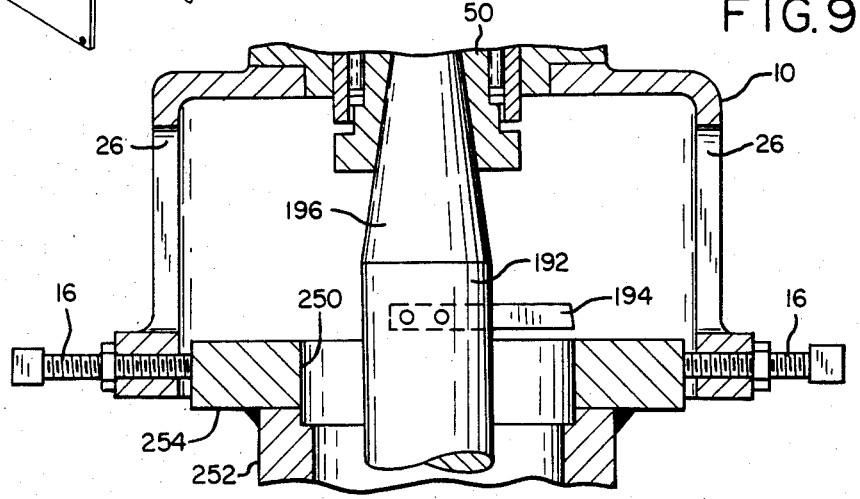

Other tool means may be substituted for the facing head as hereinabove described. An example of an alternative tool means comprises a boring bar 192, as illustrated in FIG. 9, provided on one end with a standard machine tool taper 196 matingly receivable within the lower end of spindle 50. The boring bar 192 carries one or more standard cutting tools 194, and in the example illustrated in FIG. 9 the boring bar is in position for reboring the central bore 250 of pipe 252 having a flange 254 to which bell 10 is attached. The spindle 10 is rotated by means of the power unit including motor 60, and the boring bar is fed in an axial direction by turning crank 76 for operating vertical feed screw 86. (See FIGS. 3 and 4.)

Figure 10:
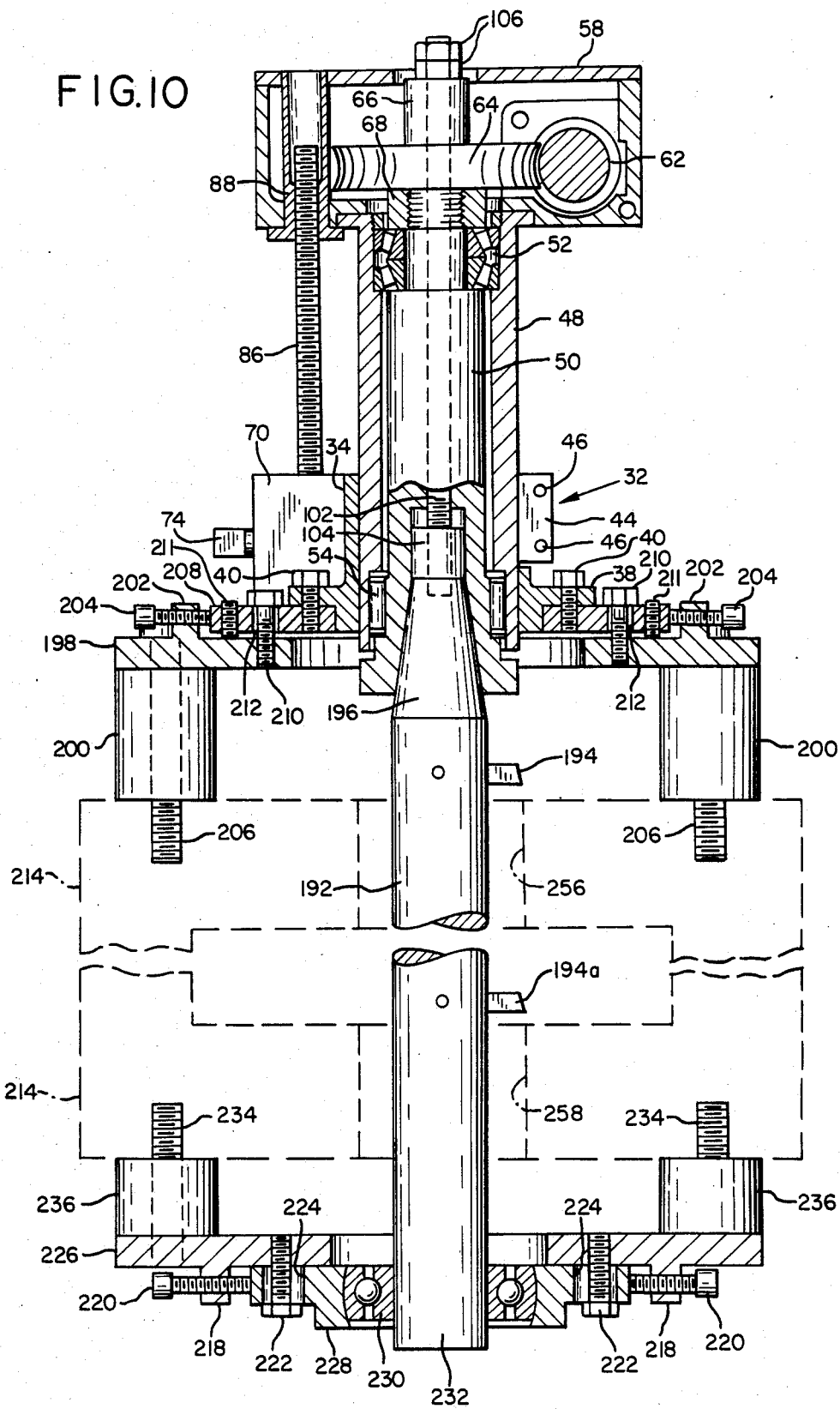

While the boring bar arrangement can be mounted with bell 10 as illustrated in FIG. 9, a frequently more advantageous construction utilizes a universal mounting plate 198 as illustrated in FIG. 10. In this example, mounting plate 198 is attached to the structure 214 to be machined with screws 206 which pass through spacing members 200. The mounting plate 198 supports a flange ring 208 bolted to flange 38 of quill clamp 32. Bolts 210 extend through oversize apertures 212 in flange ring 208 to secure flange ring 208 to the mounting plate, with provision for adjustment being made so that the boring bar 192 may be centered with respect to bores 256 and 258 to be machined in structure 214 before screws 210 are completely tightened. Blocks 202, positioned at ninety degree intervals around the top of mounting plate 198, threadably receive radial adjusting screws 204 which bear against the peripheral edge of flange ring 208. These screws 204 are adjusted for centering the device and screws 211 provide a perpendicular adjustment. Screws 210 are the tightened.

For boring bars of substantial length, an outboard bearing assembly is provided which consists of a second mounting plate 226 attached to structure 214 with screws 234 passing through spacers 236. Bearing block 228 supports ball bearings 230 receiving end 232 of the boring bar, with the ball bearings being rotatable to allow for self alignment between the bearings 230 and the boring bar. The block 228 is mounted to plate 226 with screws 222 which pass through oversize holes 224 in block 228, allowing centering adjustment of block 228 with screws 220. Screws 220 threadably engage blocks 218 mounted at ninety degree intervals around the underside of plate 226, and bear on the periphery of block 228. When centering of the boring bar 192 has been secured by adjusting screws 220, screws 222 may be tightened for holding the spherical bearing arrangement in place.

The advantage of having different sizes of quill housings 48 and feed screws 86 is readily appreciated from consideration of the FIG. 10 arrangement. The quill housing and spindle length may be selected as will provide sufficient adjustment of the boring bar 192 in a vertical direction to machine the required depth of bores 256 and 258 by tools 194 and 194a, respectively. Providing the machine spindle 50 with a standard machine tool taper enables the exchange of different tool means, for example the facing head of FIGS. 1-8, and the boring bars of FIGS. 9-10.

Figure 11:
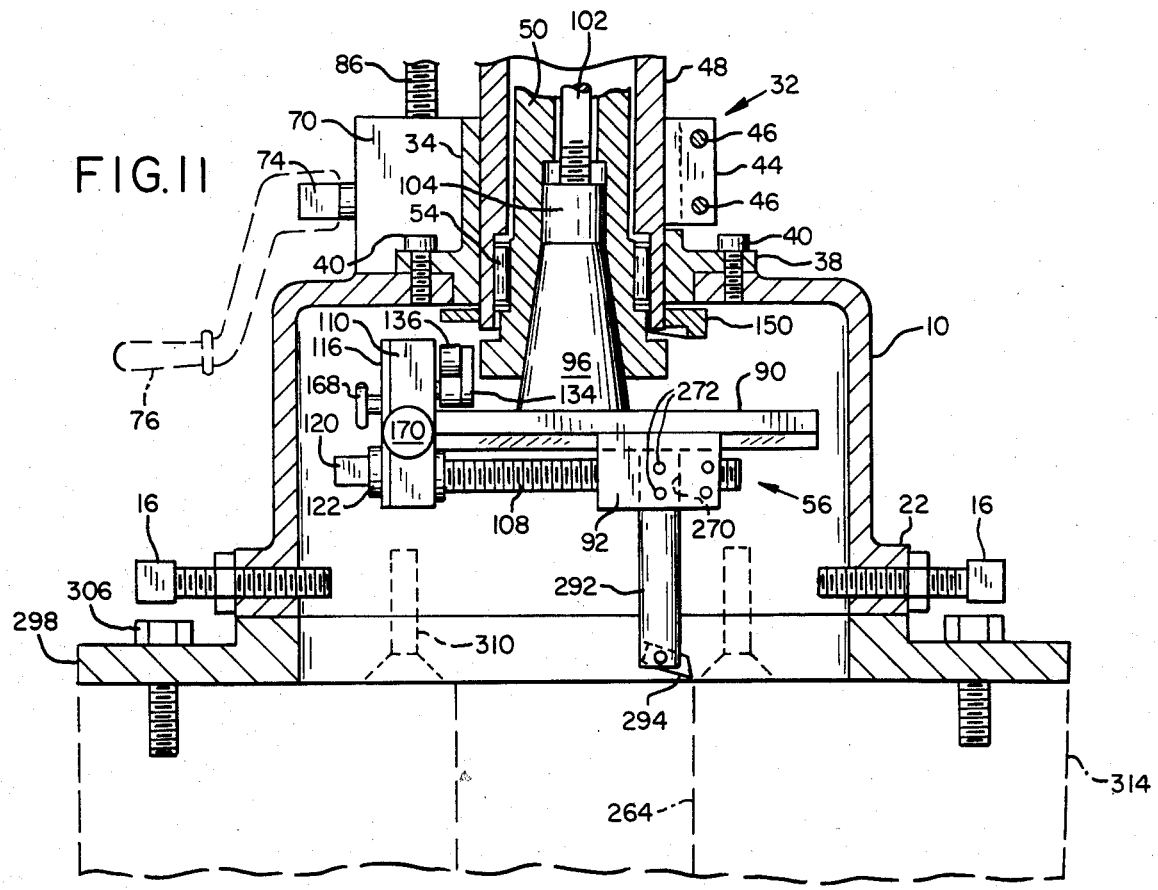

A further feature of the portable lathe device according to the present invention is illlustrated in FIG. 11. Bell 10 is shown mounted on structure 314 having an end bore 264. In this example bell 10 is secured to an intermediate mounting plate 298 with screws 310, plate 298 being attached to structure 314. Tool carrier 92 is provided with a vertical cylindrical bore 270 for receiving a short boring bar 292 carrying tool 268 adapted to machine bore 264. The boring bar 292 is secured in the tool carrier with clamping screws 272. Inasmuch as the boring bar 292 is mounted on a radially movable tool carrier, the bar can be positioned radially through operation of lead screw 108. Vertical feed of the tool is accomplished by manual rotation of crank 76, as motor 60 of the power unit rotates the tool means 56 carrying the boring bar.

It is thus seen the modular portable lathe device according to the present invention is adaptable to a number of uses, examples of which have been described hereinabove. The modularity enables the exchange of spindles of different lengths for permitting greater axial movement of a tool device or a boring bar, and, of course permits the substitution of different tool devices as well as exchange of mounting means for attaching the lathe device to different structure. The power unit is detachable as described, and is adaptable for providing drive to any tool means having a standard machine tool taper. Thus, in addition to the machining examples above described, the device according to the present invention can be used for milling, drilling or for similar purposes requiring an adjustable source of rotational power.

While we have shown and described plural embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. A lathe device adapted to be mounted on work to be machined, said device comprising:
   a mounting portion,
   a spindle housing carried by the mounting portion,
   a spindle having first and second opposite ends and defining a central axis, said spindle being adapted to be connected at its first end to a motor,
   bearing means supporting the spindle for rotation about its central axis within the spindle housing,
   tool mounting means carried by the spindle at the second end thereof for rotation with the spindle about its central axis, said tool mounting means comprising a tool carrier for receiving a tool, guide means defining a path of movement of the tool carrier, said path of movement intersecting said central axis, and feed means for moving the tool carrier along said path of movement between a first position in which a tool held in the tool carrier is located on said central axis and a second position which defines the perimeter of the area to be machined and in which the tool is spaced from said central axis, the feed means comprising a lead screw, a cam follower for rotating the lead screw, a cam attached to the spindle housing for actuating the cam follower to rotate the lead screw as the spindle rotates the tool mounting means, clutch means effective between the cam follower and the lead screw for driving the lead screw in a given rotational direction in response to movement of the cam follower, means for adjustably spacing the cam follower from the dwell of the cam to adjust the rotation of the lead screw by the cam follower, and reversing means effective between the cam follower and the lead screw for reversing the direction of rotation of the lead screw, and means for attaching the mounting portion to the work at locations that are spaced farther from central axis than is the perimeter of the area to be machined.

2. The lathe device according to claim 1, wherein the spindle housing is carried by the mounting portion in a manner permitting movement of the spindle housing relative to the mounting portion along said central axis, and wherein the device further comprises axial feed means for moving the spindle housing axially of the mounting portion.

3. The lathe device according to claim 1, wherein the tool mounting means are removably attached to the spindle, and the lathe device further comprises a boring bar that is attachable to the spindle in place of said tool mounting means.

4. The lathe device according to claim 1, wherein said mounting portion comprises a mounting bell.

5. The lathe device according to claim 1, wherein the spindle housing is carried by the mounting portion in a manner permitting movement of the spindle housing relative to the mounting portion along said central axis, and wherein the device further comprises axial feed means for moving the spindle housing axially of the mounting portion.

6. The lathe device according to claim 1, wherein the spindle extends through the spindle housing, and the device also comprises a quill clamp removably attached to the mounting portion and in which the spindle housing is fitted in axially slidable manner.

7. The lathe device according to claim 6, wherein the quill clamp is provided with a rotatable axial feed screw and the spindle housing includes a threaded portion that is in threaded engagement with the axial feed screw and is fixed against rotation, and the device includes means for rotating the feed screw for axially positioning the spindle housing in the quill clamp.

8. A cross feed mechanism for use with a portable lathe device including a mounting portion and a spindle that is rotatable relative to the mounting portion, said cross feed mechanism comprising:
a cam mounted on the mounting portion,
a cam follower mounted on the spindle and positioned for contacting the cam as the spindle rotates,
a lead screw,
clutch means effective between the cam follower and the lead screw for driving the lead screw in a given direction in response to movement of the cam follower,
means adjustably spacing the cam follower from the dwell of the cam to adjust the rotation of the lead screw by the cam follower, and
lever operated reversing gear means effective between the cam follower and the lead screw.

9. The cross feed mechanism according to claim 8, wherein the reversing gear means comprise a first gear connected to the cam follower, a second gear connected to the lead screw, a third gear in meshing engagement with the first gear, and a fourth gear in meshing engagement with the second gear, said fourth gear being movable between a position in which it is in meshing engagement with the first gear and a position in which it is in meshing engagement with the third gear.

10. A cross feed mechanism according to claim 8, wherein the lead screw is disposed radially of the spindle and the mechanism further comprises a tool carrier transversely movable by the lead screw.

* * * * *